(12) United States Patent
Yon

(10) Patent No.: US 7,559,511 B2
(45) Date of Patent: Jul. 14, 2009

(54) CLAMP-TYPE RETENTION ELEMENT FOR AXISYMMETRICAL COMPONENTS SUCH AS CABLES OR TUBES, IN PARTICULAR FOR APPLICATION ON VEHICLES

(75) Inventor: Fulvio Yon, Donnas (IT)

(73) Assignee: ITW Automotive Italia S.R.L., Turin (IT)

( * ) Notice: Subject to any disclaimer, the term of this patent is extended or adjusted under 35 U.S.C. 154(b) by 178 days.

(21) Appl. No.: 11/057,229

(22) Filed: Feb. 15, 2005

(65) Prior Publication Data
US 2005/0178930 A1 Aug. 18, 2005

(30) Foreign Application Priority Data
Feb. 17, 2004 (IT) ............................ TO2004A0088

(51) Int. Cl.
*F16L 3/22* (2006.01)
(52) U.S. Cl. ........................... 248/68.1; 248/55; 248/56; 248/65; 248/71; 248/74.4; 248/74.2; 174/135; 174/68.1; 174/68.3; 174/72 A; 174/95; 174/97; 174/659; 174/663
(58) Field of Classification Search .................. 248/55, 248/56, 65, 68.1, 71, 74.4, 74.2; 174/135, 174/68.1, 68.3, 72 A, 95, 97, 659, 663
See application file for complete search history.

(56) References Cited

U.S. PATENT DOCUMENTS

| 3,163,712 | A | * | 12/1964 | Cochran | 174/164 |
|---|---|---|---|---|---|
| 3,288,407 | A | * | 11/1966 | Piper et al. | 248/56 |
| 3,430,904 | A | * | 3/1969 | Soltysik | 248/74.2 |
| 3,894,706 | A | * | 7/1975 | Mizusawa | 248/68.1 |
| 3,998,268 | A | * | 12/1976 | Sagan | 165/162 |
| 4,007,899 | A | * | 2/1977 | Piepers et al. | 248/49 |
| 4,541,602 | A | * | 9/1985 | Potzas | 248/544 |
| 4,760,495 | A | * | 7/1988 | Till | 361/804 |
| 4,840,333 | A | * | 6/1989 | Nakayama | 248/68.1 |
| 4,840,345 | A | * | 6/1989 | Neil et al. | 248/74.2 |
| 4,854,795 | A | * | 8/1989 | Duran | 411/352 |
| 4,881,705 | A | * | 11/1989 | Kraus | 248/74.2 |
| 4,899,964 | A | * | 2/1990 | Sick | 248/68.1 |
| 4,930,733 | A | * | 6/1990 | Logsdon | 248/56 |
| 4,936,530 | A | * | 6/1990 | Wollar | 248/71 |
| 4,970,350 | A | * | 11/1990 | Harrington | 174/661 |
| 5,002,243 | A | * | 3/1991 | Kraus et al. | 248/68.1 |
| 5,012,046 | A | * | 4/1991 | Gobin | 174/135 |

(Continued)

*Primary Examiner*—J. Allen Shriver, II
*Assistant Examiner*—Nkeisha J Smith
(74) *Attorney, Agent, or Firm*—Lowe Hauptman Ham & Berner LLP

(57) ABSTRACT

A clamp-type retention element for an axisymmetrical component for vehicles, such as a cable or a tube for oil or fuel, has an axis of symmetry; the retention element has at least one through seat, which has an insertion opening and is designed to house a portion of the axisymmetrical component, a snap-action closing element of the insertion opening, hooking elements designed to co-operate with a support, elastic elements designed to co-operate with the portion of the axisymmetrical component within the seat, and a guide element of the portion of the axisyrumetrical component within the seat for identifying a housing position of the portion of the axisymmetrical component under the action of the elastic elements. The elastic elements are flexible in a direction substantially parallel to the axis of symmetry when the portion of the axisymmetrical component is in the housing position.

12 Claims, 1 Drawing Sheet

U.S. PATENT DOCUMENTS

| | | | |
|---|---|---|---|
| 5,113,717 A * | 5/1992 | Plamper | 74/502.6 |
| 5,170,984 A * | 12/1992 | Ruckwardt | 248/635 |
| 5,234,185 A * | 8/1993 | Hoffman et al. | 248/56 |
| 5,243,139 A * | 9/1993 | Law | 174/153 G |
| 5,271,588 A * | 12/1993 | Doyle | 248/68.1 |
| 5,458,303 A * | 10/1995 | Ruckwardt | 248/74.2 |
| 5,460,342 A * | 10/1995 | Dore et al. | 248/74.2 |
| 5,535,969 A * | 7/1996 | Duffy, Jr. | 248/68.1 |
| 5,568,906 A * | 10/1996 | Hahn et al. | 248/74.1 |
| 5,588,683 A * | 12/1996 | Schliessner | 285/62 |
| 5,653,411 A * | 8/1997 | Picco et al. | 248/74.1 |
| 5,675,128 A * | 10/1997 | Simon | 174/152 G |
| 5,677,513 A * | 10/1997 | Ito et al. | 174/72 A |
| 5,765,787 A * | 6/1998 | de Beers et al. | 248/73 |
| 5,782,090 A * | 7/1998 | Locke | 60/397 |
| 5,789,707 A * | 8/1998 | Damm et al. | 174/658 |
| 5,820,048 A * | 10/1998 | Shereyk et al. | 248/68.1 |
| 5,906,342 A * | 5/1999 | Kraus | 248/74.1 |
| 5,947,426 A * | 9/1999 | Kraus | 248/74.2 |
| 6,036,145 A * | 3/2000 | Calabrese et al. | 248/68.1 |
| 6,089,513 A * | 7/2000 | Cau et al. | 248/68.1 |
| 6,211,465 B1 * | 4/2001 | Streit | 174/653 |
| 6,241,198 B1 * | 6/2001 | Maruyama | 248/49 |
| 6,278,061 B1 * | 8/2001 | Daoud | 174/659 |
| 6,308,921 B1 * | 10/2001 | Borzucki | 248/68.1 |
| 6,450,459 B2 * | 9/2002 | Nakanishi | 248/68.1 |
| 6,565,049 B2 * | 5/2003 | Hahn | 248/68.1 |
| 6,641,093 B2 * | 11/2003 | Coudrais | 248/73 |
| 6,708,933 B2 * | 3/2004 | Girodo | 248/74.2 |
| 6,809,257 B2 * | 10/2004 | Shibuya | 174/481 |
| 6,899,304 B2 * | 5/2005 | Bellmore et al. | 248/65 |
| 2004/0007648 A1 * | 1/2004 | Miura et al. | 248/71 |
| 2004/0108421 A1 * | 6/2004 | Yuta et al. | 248/71 |
| 2004/0144897 A1 * | 7/2004 | Maruyama | 248/68.1 |
| 2004/0182973 A1 * | 9/2004 | Kawai | 248/71 |
| 2005/0116122 A1 * | 6/2005 | Nakanishi | 248/68.1 |
| 2005/0121560 A1 * | 6/2005 | Slyter | 248/71 |
| 2005/0284989 A1 * | 12/2005 | Mizukoshi | 248/65 |

* cited by examiner

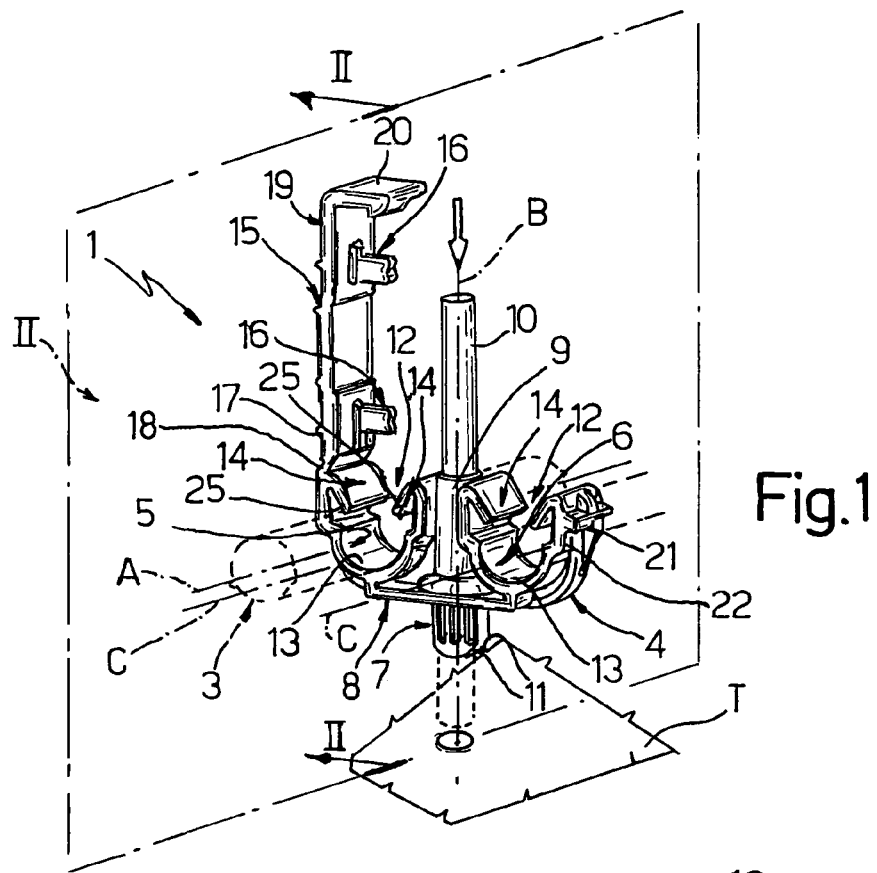

CLAMP-TYPE RETENTION ELEMENT FOR AXISYMMETRICAL COMPONENTS SUCH AS CABLES OR TUBES, IN PARTICULAR FOR APPLICATION ON VEHICLES

FIELD OF THE INVENTION

The present invention relates to an improved retention element of the clamping type, particularly for fixing, to a support of a vehicle, for example to the underbody, axisymmetrical components, typically ducts or pipes for fluids for systems on board the vehicle, such as petrol or oil, or else electrical cables. In particular, the invention relates to a retention element of a "universal" type capable of clamping selectively, within it, pipes, ducts or cables having diameters that may even be very different from one another, in an effective way and ensuring at the same time contained overall dimensions.

BACKGROUND OF THE INVENTION

It is known that for fixing ducts or pipes for carrying petrol to a frame or underbody of an automobile, clamp-type retention elements are used, which comprise a supporting body having a contrast surface, means for fixing the ducts on the supporting body and hooking means designed to keep the contrast surface in contact with the frame.

The supporting body comprises a first jaw bearing the contrast surface and a second jaw, shaped like a clamp, which, together with the first jaw, defines, in a closing position, a housing seat for a portion of an axisymmetrical duct or pipe.

To enable fixing of ducts or pipes having different diameters, the fixing means comprise flexible projecting elements, carried by the supporting body in a position corresponding to the seats. The known flexible projecting elements are arranged on a side wall, which delimits the through seat, and extend in cantilever fashion towards the inside of the seat in a direction transverse with respect to the axis of symmetry of the axisymmetrical duct.

Consequently, when the first and the second jaws are closed, the projecting elements come into contact with the duct or pipe, bend, and exert an elastic action, which, on the one hand, tends to compensate for a certain variation of diameter of the duct or pipe and, on the other hand, has the purpose of retaining the component in the seat, substantially without allowing any vibrations.

However, the aforesaid elastic projecting elements do not adapt easily to the retention of components having diameters that are very different from one another. On the one hand, if they are made with a low stiffness, they adapt more easily for retaining components of different diameters but, on the other hand, may allow excessive vibrations. If, instead, they are made with a high stiffness they become unsuitable not only for retaining tubes of even only slightly different diameter effectively but are not even able to adapt easily to the different dimensions of tubes with the same nominal diameter (due to the constructional tolerances), with possible generation of noise. In the worst cases, they can even hinder a correct flow of fluid, restricting the cross section of the duct or pipe to be retained.

Furthermore said projecting elements can lead to relatively large overall dimensions in a radial direction, in so far as they are housed between the side wall of the housing seat and the duct or pipe and in use are set between the duct or pipe and the side wall itself.

SUMMARY OF THE INVENTION

It is therefore a purpose of the present invention to overcome the drawbacks described above by means of a retention element for axisymmetrical components that will enable an effective fixing action, without any noise or vibration, of axisymmetrical components having different diameters and that will moreover enable contained overall dimensions to be achieved, at the same time with low production costs and considerable ease of assembly.

In particular, the retention element of a clamp type according to the invention has: at least one through seat having an insertion opening and being designed to house a portion of an axisymmetrical component; a snap-action closing element of the insertion opening; hooking means designed to co-operate with a support, for example the underbody of a vehicle; elastic means designed to co-operate with the portion of said axisymmetrical component within said at least one seat; and a guide element of the portion within the seat for identifying a housing position of the portion under the action of the elastic means; said retention element is characterized in that the elastic means are flexible in a direction substantially parallel to the axis of symmetry (A) when the portion is in the housing position.

The elastic means comprise at least one elongated projecting element that develops in cantilever fashion parallel to the direction of insertion in use of the axisymmetrical component, i.e., perpendicular to an axis of symmetry thereof and/or of the through seat, set lying on a plane of symmetry of the housing seat. The projecting element is thus stressed in use by an end load that causes its bending within its plane of lie.

In this way, the fixing means exert in a more effective way their action on the duct or pipe and are simpler to adapt from the sizing point of view. Furthermore, the projecting elements bend along a direction parallel to the axis of symmetry A, basically on (or parallel to) the plane of symmetry of the through seat which in use contains the axis A, thus enabling a reduction in the overall transverse dimensions of the retention element.

Finally, the retention element in question can be readily obtained of a single piece by injection moulding of a synthetic plastic material, without entailing the presence of any undercuts that might complicate the construction of the moulds. Consequently, low production costs are guaranteed.

BRIEF DESCRIPTION OF THE DRAWINGS

Further characteristics and advantages of the invention will appear clearly from the ensuing description of a non-limiting example of embodiment thereof, provided with reference to the figures of the annexed plate of drawings, in which:

FIG. 1 illustrates a perspective view of a retention element made according to the present invention;

FIG. 2 illustrates a cross section, with parts removed for reasons of clarity, of the retention element illustrated in FIG. 1 according to the line II-II in a first condition of tightening of a duct or pipe having a diameter "d"; and FIG. 3 illustrates a cross section, with parts removed for reasons of clarity, of the retention element illustrated in FIG. 1 that is similar to the one illustrated in FIG. 2 in a second condition of tightening of a duct having a diameter "D" greater than "d".

DETAILED DESCRIPTION OF THE INVENTION

With reference to FIG. 1, designated as a whole by 1 is a retention element that can be fixed in a known way to a support T, in the case in point the frame or underbody of a vehicle (not illustrated herein), and designed to co-operate with a portion 2 of an axisymmetrical component 3 of axis A, for example a duct or pipe for the supply of a service fluid (oil, fuel) to a system (not illustrated herein) on board the vehicle. In the ensuing description, specific reference will be made to said situation, but it is clear that the element 1 can house an axisymmetrical component of any type, for example constituted by an electrical cable or by a harness of electrical cables.

The retention element 1, which is as a whole similar in its general structure to known retention elements of the "clamping-type", comprises, in the non-limiting example illustrated herein: a supporting body 4 having two through seats 5, 6, set alongside one another and each designed to house the portion 2 of a duct or pipe 3 in a housing position; and expandable hooking means 7 for fixing the retention element 1 to the frame or underbody T of the vehicle. It is clear that retention elements according to the invention can include just one through seat, or else more than two through seats, according to the requirements.

In particular, the supporting body 1 has a contrast surface 8 set horizontal in use and in contact with the support T, and a hollow element as a guiding sleeve 9 having an axis B perpendicular to the contrast surface 8, i.e., set vertical in use, centrally with respect to the through seats 5, 6.

The hooking means 7 comprise a pin 10, which can slide within the sleeve 9 and is provided a plurality of tabs 11 flexibly connected to the contrast surface 8 and arranged symmetrically with respect to the axis B in a position corresponding to the sleeve 9, so as to be able to expand when the pin 10 is pushed in the direction of the contrast surface 8.

The through seats 5, 6, arranged symmetrically with respect to the pin 10, have respective insertion openings 12, which face in a direction opposite to the contrast surface 8 and are delimited by respective semi-cylindrical bottom walls 13, each having a rectilinear axis C.

In particular, the axes C are parallel to one another and perpendicular to the axis B, and each semi-cylindrical bottom wall 13 defines a concavity facing the respective insertion opening 12. When a duct or pipe 3 is in the housing position, the semi-cylindrical wall 13 of the respective housing seat 5, 6 functions as guide in the housing position, forcing the axis A of the portion of the duct or pipe to remain parallel to the axis C of the seat.

The portion 2 of the duct or pipe 3 within the housing seat 5, 6 is moreover identified by plane flexible tabs 14, which are arranged in the proximity of each insertion opening 12 on opposite sides and symmetrically with respect to a vertical plane Π through the axis C, said tabs being moreover inclined so that they converge towards the axis C itself.

In order to prevent the portion 2 of the duct 3 from accidentally coming out of the corresponding through seat 5, 6 and in order to render fixing of portions 2 having different diameters more effective (FIGS. 2 and 3) the retention element 1 comprises a closing wall 15, which covers the supporting body 4 in a position corresponding to the insertion openings 12 in a closing position and has a pair of projecting elements 16, one for each through seat, set perpendicular with respect to the closing wall 15 and designed to set themselves between the tabs 14 of the corresponding through seats 5, 6 when the closing wall 15 is lowered.

The closing wall 15 further comprises a first end portion 17 hinged on the supporting body 4 in the proximity of the tab 14 of the through seat 5 furthest away from the axis A via a plastic hinge formed by a deformable wall 18 made of polymeric material, and a second end portion 19, opposite to the first end portion 17, having a pawl 20 designed to co-operate via snap-action with a rib 21, which is set parallel to the axis C in a position corresponding to a side surface 22 of the supporting body 4 facing outwards with respect to the axis B and opposite to the deformable wall 18 with respect to the axis B itself.

Each of the projecting elements 16 carried by the closing wall 15 is substantially L-shaped and comprises integrally a wall 23, which bends elastically and which in use is set vertical and is made of a single piece with the closing wall 15, and a horizontal resting wall 24 designed to enter into contact with the portion 2 of the duct 3 in the closing position.

The resting wall 24 of both of the projecting elements 16 is set at a distance from the axis C by an amount smaller than the respective free ends 25 of the tabs 14. The distance from the axis C in the closing position is moreover determined by the fact that, in the case of the projecting element nearest to the deformable wall 18, the circular path followed by the projecting element 16 does not interfere with the corresponding tab 14.

In particular, a circumference of diameter "d" having its centre on the plane Π is tangential both to the bottom of the semi-cylindrical wall 13 and to the resting wall 24 of the projecting element 16. A second circumference of diameter "D" greater than "d", having its centre on the plane Π is tangential both to the bottom of the semi-cylindrical wall 13 and to the tabs 14 and is secant to the projecting element 16.

In use, the retention element 1, which is obtained by injection moulding of a synthetic plastic material in a single piece with the closing wall 15 in an open position, is pre-arranged in the desired position along two ducts or pipes 3 to be fixed.

Then, the portions 2 of the ducts 3 are inserted into the through seats 5, 6 through the insertion openings 12, and the closing wall 15 is lowered and blocked via snap-action by the pawl 20.

In a first case (FIG. 2), in which the portion 2 of the duct 3 has a diameter equal to "d", fixing is determined by the resting wall 24 of the projecting elements 16 and by the semi-cylindrical wall 13. Fixing is adequate in so far as the weight of the duct 2 is relatively small and the action of the projecting element 16 is sufficient.

As the diameter of the portion 2 of the duct 3 increases, the weight increases accordingly, but in this case, once the closing wall 15 is lowered, the projecting element 16 interferes with the portion 2 itself, generating an end load, which tends to bend the bending wall 23 in a direction substantially parallel to the axes A and C and such as to lift the resting wall 24. In this way, the projecting element 16 exerts an elastic action that increases with the diameter of the duct 3, which maintains the portion 2 of the duct or pipe 3 in position against the semi-cylindrical wall 13.

When (FIG. 3) the portion 2 of the duct or pipe 3 has a diameter equal to "D", the weight is maximum, and fixing is accomplished also by the tabs 14 as well as by the projecting element 16 and by the semi-cylindrical wall 13. Furthermore, it is now the bending wall 23 that co-operates with the duct or pipe 3 to be retained, since in the meantime the projecting element 16 has assumed a bent, substantially semicircular shape, which enables control of the bending load. The entire deformation of each projecting element 16 moreover occurs, according to the invention, strictly on (or parallel to) the plane Π of symmetry of the respective seat 5, 6, which normally constitutes in use the plane of lie of the respective projecting element 16.

Before or after blocking of the axisymmetrical components 3, the retention element 1 of the invention can be fixed to the support T by introducing the tabs 11 of the hooking means 7 within a hole of the frame or underbody T and by then blocking them in position by pressing the pin 10, which causes the tabs 11 to diverge.

the invention claimed is:

1. A retention element for at least an elongated component, said retention element comprising:
   a supporting body;
   a guiding sleeve on said body and dividing said body into a first part and a second part, said sleeve being adapted to receive a pin for fixing the retention element to a support;
   a first through seat defined on the first part of said body;
   a second through seat defined on the second part of said body;
   a closing wall hingedly connected to the supporting body and moveable between an open position wherein the closing wall is separated from supporting body and a closed position wherein the closing wall is closed against the supporting body, said closing wall having an opening between a first end portion and a second end portion thereof;
   wherein each of the first and second through seats defines a semi-cylindrical bottom wall for accommodating the elongated component; and
   when the closing wall is in the closed position, said opening is in communication with the guiding sleeve and the closing wall is located opposite the semi-cylindrical bottom wall of each of the first and second through seats; and
   wherein the closing wall carries first and second flexible projecting elements which are configured so that when the closing wall element is the closed position, the first and second flexible projecting elements extend directly toward the elongated element and engage a top of the elongated component whereby a free portion thereof deflected at least at right angles to a base portion thereof.

2. The retention element according to claim 1, wherein each of the first and second through seats has a pair of tabs defining an insertion opening closable by said closing wall, said pair of tabs facing one another and converging towards the bottom wall.

3. A retention element, said retention element comprising:
   a supporting body;
   a guiding sleeve on said body and dividing said body into a first part and a second part, said sleeve being adapted to receive a pin for fixing the retention element to a support;
   a first through seat defined on the first part of said body;
   a second through seat defined on the second part of said body;
   a closing wall hingedly connected to the supporting body and moveable between an open position and a closed position wherein the closing wall is closed against the supporting body;
   wherein each of the first and second through seats defines a semi-cylindrical bottom wall for respectively accommodating an elongated component; and
   first and second projecting elements carried by said closing wall, each of said first and second projecting elements being configured to extend toward the first and second through seats respectively when the closing wall is in the closed position, and each having:
      a bending wall portion, said bending wall portion having a major width dimension and a minor thickness dimension and configured with respect to the closing wall so as to be directly engageable with the elongated component so that the major width dimension is oriented essentially perpendicular to an axis of the elongated component whereby the bending wall directly engages an upper portion of the elongated component so that a free end portion is deflected in the direction of the axis of the elongated component by the engagement with the upper portion of the elongated component when the closing wall is in the closed position, thereby forming a resting wall portion which is angled away from said bending wall portion and which is configured to rest atop and remain above the elongated component.

4. The retention element according to claim 3, wherein each of the first and second through seats has a pair of tabs defining an insertion opening closable by said closing wall, said pair of tabs facing one another and converging towards the bottom wall.

5. A retention element for at least an elongated component, said retention element comprising:
   a supporting body;
   a guiding sleeve on said body and dividing said body into a first part and a second part, said sleeve being adapted to receive a pin for fixing the retention element to a support;
   a first through seat defined on the first part of said body;
   a second through seat defined on the second part of said body;
   a closing wall hingedly connected to the supporting body and moveable between an open position and a closed position wherein the closing wall is closed against the supporting body;
   wherein each of the first and second through seats defines a semi-cylindrical bottom wall for accommodating the elongated component; and
   at least one flexible projecting element carried by said closing wall, said projecting element having:
      a bending wall portion projecting directly from said closing wall and configured to be directly engageable with the elongated component so as to be deformed via contact therewith and so that a free end portion is bent at an angle by the engagement with the elongated component when the closing wall is in the closed position, thereby forming a resting wall portion which is angled away from said bending wall portion and which is configured to rest atop and remain above the elongated component,
   wherein each of the first and second through seats has a pair of tabs defining an insertion opening closable by said closing wall, said pair of tabs facing one another and converging towards the bottom wall, and
   wherein in the closed position the bending wall is located centrally of the insertion opening.

6. The retention element according to claim 5, wherein, when said closing wall is in the open position, the bending wall portion is at least transversely positioned with respect to an axis of said sleeve.

7. The retention element according to claim 5, when said closing wall is in the closed position, the resting wall portion is transversely positioned with respect to an axis of said guiding sleeve.

8. The retention element according to claim 5, wherein, when said closing wall is in the closed position and an elongated element having a predetermined diameter is present, the bending wall portion and the resting wall portion are substantially perpendicular to each other.

9. The retention element according to claim 8, wherein in the closed position, without the component in the seat, said bending wall is parallel to an axis of said guiding sleeve.

10. The retention element according to claim 5, wherein in the closed position, without the component in the seat, a distance between said resting wall and the bottom wall of the respective seat is smaller than a diameter of said semi-cylindrical bottom wall.

11. A retention element for an elongated component, said retention element comprising:

a supporting body comprising at least one through seat, said through seat defining a semi-cylindrical bottom wall for accommodating the elongated component;

a closing wall hingedly connected to the supporting body and moveable between an open position and a closed position wherein the closing wall is closed against the supporting body;

at least one flexible projecting element carried by said closing wall, said projecting element having;

a bending wall portion projecting directly from said closing wall toward the semi-cylindrical bottom wall and configured to be directly engageable with the elongated component so as to be deformed via contact therewith and so that a free end portion is bent at an angle by the engagement with the elongated component when the closing wall is in the closed position, thereby forming a resting wall portion which is angled away from said bending wall portion and which is configured to rest atop and remain above the elongated component, wherein said through seat has a pair of tabs defining an insertion opening closable by said closing wall, said pair of tabs face one another and converge towards the bottom wall, and wherein in the closed position the bending wall is located centrally of the insertion opening.

12. The retention element according to claim 11, wherein in the closed position, without the component in the seat, a distance between said resting wall and the bottom wall of the respective seat is smaller than a diameter of said bottom wall.

\* \* \* \* \*